Sept. 28, 1937.  R. B. LOWRY  2,094,157

MOLD FOR FORMING RUBBER ARTICLES

Filed May 16, 1935

INVENTOR.
Robert B. Lowry
BY
Kenneth E. Stuart
ATTORNEY.

Patented Sept. 28, 1937

2,094,157

UNITED STATES PATENT OFFICE 2,094,157

MOLD FOR FORMING RUBBER ARTICLES

Robert B. Lowry, Niagara Falls, N. Y., assignor to Hooker Electrochemical Company, New York, N. Y., a corporation of New York Application May 16, 1935, Serial No. 21,821

1 Claim. (Cl. 18—47)

Heretofore it has been customary to form rubber articles from the latex or rubber in a viscous condition by means of a mold of porcelain. The mold is dipped, repeatedly if necessary, until a coating of the desired thickness has adhered to it. The rubber is then vulcanized or otherwise cured and stripped from the mold. Such molds are made from clay of a special grade, which, after it has been formed into the desired shape, is baked and glazed. Notwithstanding the highly glazed surface of such molds the rubber, after it has been cured, will adhere unless the surface be coated with a lubricant. Molds made entirely of glass are also sometimes used. Even the use of glass does not prevent sticking or obviate the necessity for a lubricant. Such porcelain or glass molds are made from a master mold and are expensive.

Various lubricants have been proposed and used, among the best of which is flaked graphite. This must be incorporated in a vehicle which is liable to exercise a deleterious effect upon the rubber.

I have discovered that a mold for forming dipped rubber articles may be made as a solid block of graphite, such as may be produced artificially in an electric furnace by the Acheson process, and that such a mold requires no lubricant whatever. The viscous rubber adheres to such a mold sufficiently for the purpose of forming a coating by dipping; but, after curing, the rubber sheet so produced readily strips from the mold.

Block graphite is an ideal material for shaping into a mold as it has no grain and can be readily sawed, drilled, planed, turned or carved. After shaping, it is hard enough to withstand the wear of use. This material is especially well suited for rubber articles for experimental purposes, or which are not likely to be required in large quantities; since it can be shaped in any well equipped machine shop, without facilities for baking and glazing clay or the special skill required for the purpose.

In the drawing I have illustrated a typical rubber article which I have successfully produced by the method described. Thus:

Figure 1:
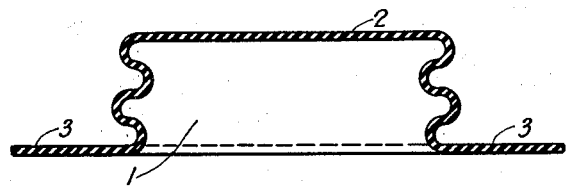
Fig. 1 is a cross-section of a rubber bellows or diaphragm made by means of my block graphite mold.

Referring to Fig. 1:

This article consists in a corrugated bellows 1 of circular cross-section, closed at one end by a diaphragm 2 and provided at the other end with the flange 3. The flange was about nine inches in overall diameter. The thickness of the walls was one-sixteenth inch. The corrugations were about one-half inch deep.

Figure 2:
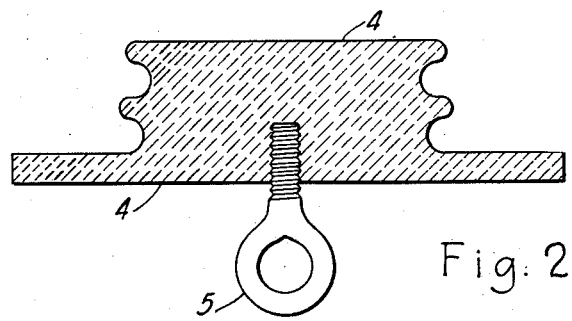
Fig. 2 is a cross-sectional view of the graphite mold from which this article was produced.
Figure 3:
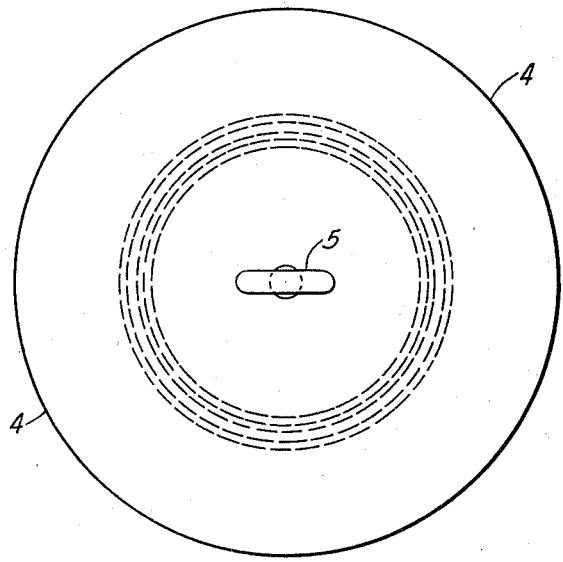
Fig. 3 is a plan view of the same.

Referring to Fig. 2:

It will be seen that the construction of the mold 4 from block graphite involved sawing, turning, drilling and threading by means of a threading tap. In this way the eyebolt 5 was let into the block to serve as a handle for use in dipping.

The use of block graphite in accordance with my invention is not, however, limited to shapes that can be made in a machine shop. This material obviously lends itself to die-sinking by means of the tools in common use for that purpose.

The rubber may be in the form of its natural latex or it may have been rendered viscous, i. e., a fluid or semifluid, by means of a volatile solvent. In the latter case the rubber may be cured or hardened by simply allowing the solvent to evaporate off. The rubber may then be stripped from the mold and used without further treatment; or a vulcanizing agent may be incorporated with the rubber before molding and after molding the rubber may be vulcanized. Any other desired method of curing may be employed.

I claim as my invention:

A mold suitable for forming rubber articles consisting of a block of homogeneous electric-furnace graphitized carbon of the desired form, said mold in unlubricated condition having the property of being adherent to viscous rubber but non-adherent to rubber that has been cured in contact therewith.

ROBERT B. LOWRY.